(12) United States Patent
Agarwal

(10) Patent No.: US 7,787,372 B2
(45) Date of Patent: Aug. 31, 2010

(54) TRANSMISSION CONTROL PROTOCOL WITH PERFORMANCE ENHANCING PROXY FOR DEGRADED COMMUNICATION CHANNELS

(75) Inventor: Anil Agarwal, Gaithersburg, MD (US)

(73) Assignee: Viasat, Inc., Carlsbad, CA (US)

( * ) Notice: Subject to any disclaimer, the term of this patent is extended or adjusted under 35 U.S.C. 154(b) by 1251 days.

(21) Appl. No.: 11/298,612

(22) Filed: Dec. 12, 2005

(65) Prior Publication Data

US 2007/0133418 A1 Jun. 14, 2007

(51) Int. Cl.
*H04L 12/66* (2006.01)
*G01R 31/08* (2006.01)
*H04W 4/00* (2009.01)

(52) U.S. Cl. ............... 370/230; 370/352; 370/328

(58) Field of Classification Search .......... 370/230–236, 370/395.4, 352, 394, 278; 709/235, 238, 709/239
See application file for complete search history.

(56) References Cited

U.S. PATENT DOCUMENTS

| 5,617,561 | A * | 4/1997 | Blaauw et al. ............... 703/26 |
| 5,930,233 | A * | 7/1999 | Kanerva et al. ............ 370/231 |
| 6,646,987 | B1 * | 11/2003 | Qaddoura ................... 370/231 |
| 6,697,331 | B1 * | 2/2004 | Riihinen et al. ............ 370/236 |
| 7,020,083 | B2 * | 3/2006 | Garcia-Luna-Aceves et al. .......................... 370/230 |
| 7,394,762 | B2 * | 7/2008 | Leith et al. ................. 370/229 |
| 7,428,595 | B2 * | 9/2008 | Deshpande ................ 709/235 |
| 2005/0022097 | A1 * | 1/2005 | Cheng ........................ 714/774 |
| 2005/0141419 | A1 * | 6/2005 | Bergamasco et al. ........ 370/230 |

OTHER PUBLICATIONS

International Search Report and Written Opinion dated Aug. 8, 2008.

* cited by examiner

*Primary Examiner*—Hanh Nguyen
(74) *Attorney, Agent, or Firm*—Sughrue Mion, PLLC

(57) ABSTRACT

The integration of an improved retransmission protocol into a performance enhancing proxy (PEP) for degraded communication links. Various embodiments of the invention include congestion control, window size adjustment algorithms, connection negotiation features, and connection establishment acceleration features.

10 Claims, 13 Drawing Sheets cwnd is not changed during retransmissions

FIG. 9

| RTTs | cwnd | cwndinc | |
|---|---|---|---|
| 0 | 8 | 1 | |
| 1 | 9 | 1.5 | |
| 2 | 10.5 | 2.25 | |
| 3 | 12.75 | 3.375 | |
| 4 | 16.125 | 5.0625 | |
| 5 | 21.1875 | 7.59375 | |
| 6 | 10.59375 | 1 | cwnd reduction due to ECN |
| 7 | 11.59375 | 1.5 | |
| 8 | 13.09375 | 2.25 | |
| 9 | 15.34375 | 3.375 | |
| 10 | 18.71875 | 5.0625 | |

FIG. 10A

| Option Mask Bit | Option Name | Description |
|---|---|---|
| 0x0001 | TCP-XL-Capable | Indicates ability to do TCP-XL retransmission protocol |
| 0x0002 | TCP-XL-Enable | Enables TCP-XL retransmission protocol |

TRANSMISSION CONTROL PROTOCOL WITH PERFORMANCE ENHANCING PROXY FOR DEGRADED COMMUNICATION CHANNELS

FIELD OF THE INVENTION

The invention generally relates to network communications over wireless links that are subject to congestion and accompanying degradation and the protocols that may be used for effective and reliable transport of packets. More specifically, the invention relates to the enhancement of reliable communications between mobile terminals that provide "communications on the move" (COTM) and geostationary satellites of the passive (bent pipe) and intelligent (on-board processing) types.

BACKGROUND OF INVENTION

A number of protocols have been developed to provide reliable packet communications between two user entities, especially where there is an unreliable communications link. The Time Sequence Protocol (TSP) is a high performance data transport protocol that is suitable for use as a link layer protocol for packet communications. The TSP is particularly suited for use over a link between two end users in a point-to-point communication environment where the link is subject to severe degradation due to interference. Such interference may be caused by environmental conditions, such as the weather, or physical impediments, such as buildings, bridges or the like, that prevent a clear link between a COTM terminal and another terminal, whether a satellite, other COTM terminal or stationary terminal. For example, in the communications system 100 illustrated in FIG. 1, a satellite 101 in geostationary orbit may be in communication with a plurality of COTM terminals COTM1-COTM4 as well as fixed site terminals FS1, FS2, the latter being coupled to the Internet 102. The fixed site terminals FS1 and FS2 are shown with large dish antennas because this is typical practice, although one of ordinary skill would understand that the fixed sites can employ small antennas if the link budget allows. The mobile terminals generally require steerable antennas to compensate for the motion of the platform. However, buildings B1 and B2 may serve to block one or more of the links between the satellite 101 and COTM terminals and create an outage, as depicted by the dashed lines. The TSP uses retransmission strategies to achieve a desired throughput and delay performance where packets are lost due to interference with an established point-to-point link. However, TSP is not applicable to network communications where links are controllably opened and closed, nor is it concerned with congestion on links since each link is established point-to-point. Moreover, even though point-to-point, end point applications communicate indirectly, via the link layer, the TSP cannot provide direct application to application communication.

The transmission control protocol (TCP) is well known standard for Internet applications and is represented by published standards that are incorporated herein by reference. The TCP protocol is combined with the Internet protocol (IP) to establish a general basis for network communications (TCP/IP). In a TCP-based system, end users enter into and depart from the network, for example by signing on to the Internet at a workstation, and the links that provide the communication between end users can open and close frequently as transmitted packets are switched. While such flexibility provides advantages, it also creates a problem with congestion on links as demand for capacity rises.

An example of a TCP based network is illustrated in FIG. 2 where a system 200 includes a satellite 201 that is in wireless communication with terrestrial satellite terminals 210, 220 over links 202, 203 so that end user workstations or servers 230, 240 may communicate with each other. The satellite terminals 210, 220, which may act as IP routers as would be known to those skilled in the art, are coupled to the satellite 201 via links 202, 203 through a satellite physical layer 211, 221, which in turn couples pairs of IP layers 212, 213 and 222, 223 to a respective Ethernet layer 214, 224 for communication via a local area network. The Ethernet layer 214 may couple directly via link 216 to a similar layer 231 in the workstation server 230 or to a similar layer 241 via links 251, 252 through the Internet 250. Each workstation or server has appropriate IP layers 232, 242, TCP layers 233, 243 and applications 234, 244. The applications may talk directly to each other via the transport layer, thereby providing a significant advantage over the TSP-based system, which only uses the link layer for communications. In the illustrated system, TCP flow control and acknowledge message exchange is provided end-to-end.

Since network links necessarily extend into the wireless domain, appropriate consideration must be given to the unique problems created when the TCP protocol is applied to a wireless network. Applying a standard transmission control protocol directly over a long delay link, such as those encountered in a ground to satellite link for example, results in poor performance due to many factors related to interference or the like. If a communication link is also subject to operational degradations, such as service outages, then network protocol performance is further diminished. For example, in a TCP protocol communication system supporting COTM terminals in moving vehicles, outages or blockages will occur when the vehicles pass under bridges or other obstructions. Thus, in COTM applications of TCP, the packet losses tend to be high, on the order of 15%-55% depending on whether the environment is open, rural or urban, and will lead to retransmissions,- thereby causing the TCP-based protocol to reduce its transfer rate. Indeed, most TCP/IP based applications, such as web access, email and ftp, as well as other applications related to voice and video, do not perform well over communication channels that link COTM terminals with fixed terminals, whether terrestrial or geostationary.

According to the conventional TCP protocol, when packets are lost, retransmissions are required according to certain rules and cause TCP to reduce its transfer rate. In addition, TCP uses a window management scheme in order to prevent congestion in the network and manage throughput. Throughput is defined as the window size "W" divided by the round trip time ("RTT"). Thus, at start-up, an initial window size "W" is set to be small, equal to one or two packets, and for a given RTT the throughput will be small. The window size W is increased exponentially (e.g., 50%) every round trip time as confidence in the capability of the link is developed, and the throughput increases accordingly. However, if a packet is lost, W is reduced exponentially (e.g., by 50%) and then increased linearly (e.g., by 0.5 packets) every round trip time, so that through put is decreased and then slowly increased. After multiple packet losses, W may be reduced to a minimum of 1 packet and then increased exponentially every round trip time until the window equals a percentage of the original window, and then is increased linearly every round trip time. For a COTM channel with periodic losses every 1-4 seconds, the instantaneous throughput is low since W stays close to 1. An example of conventional TCP performance over a satellite link is illustrated in FIG. 3. Time flows down the page, and the originating terminal is designated Tx (on the left) and the receiving terminal is on the right (Rx). Here a window of 8 kbytes and an RTR of 500 ms yield a throughput of 128 kbps, given the fact that all eight 1-kbyte packets of data require an acknowledgment (ACK). The throughput is severely limited, even though a 2 Mbps channel is used.

In the industry, signal outages often are compensated through the use of ARQ (Automatic Retransmission request) techniques. Link layer ARQ-S provides for retransmission of lost packets between the COTM terminal and the payload, e.g., a TCM satellite payload. In such case, the payload must maintain a separate ARQ session with every COTM terminal and the COTM terminal must maintain one ARQ session with the payload. Link layer ARQ-T requires retransmission of lost packets between COTM terminal and a fixed or other COTM terminal. In ARQ-T, the ARQ must be embedded in the terminal IP layer, so that payload can route ARQ packets. The fixed terminal must maintain a separate ARQ session with every destination COTM terminal and each COTM terminal must maintain a separate ARQ session for every one of its destination terminals.

Notwithstanding the potential benefits of ARQ techniques, ARQ interacts poorly with end-to-end TCP protocols, and even proxies. ARQ causes packets to get delayed and causes TCP to time out, reduce window sizes and invoke its own retransmissions. This unfavorable interaction is exacerbated when employed over long delay links, due to the long delay necessary for each retransmission. Moreover, ARQ will not fix end-to-end TCP limitations such as small TCP windows, small initial windows, slow windows increases, and lack of support for ECN (Explicit Congestion Notification), which is a TCP/IP standard that uses two bits in the IP header.

The TCP-ECN standard, particularly as detailed in RFC3168 (see Ramakrishnan et al, *The Addition of ECN to IP*, September 2001), specifies the use of two bits in the IP header of data packets to signal among routers and connection endpoints as to the existence of congestion. Congestion on a TCP network causes loss of packets. In order to identify congestion as a cause of packet loss, a sending TCP terminal can set an ECN-capable bit in the IP header of data packets, and intermediate routers can set the ECN bit in the IP header when they experience congestion while forwarding a transmitted packet. If the ECN bit is set, the receiver TCP terminal extracts the ECN bit and sends it to the sending TCP terminal in the TCP header of a subsequent ACK packet. The sending TCP terminal uses that information to slow down the transmission rate.

The number of packets of unacknowledged data that are permitted to be outstanding at any given time, before a congestion or failure condition is established, is specified by a value CWND. The value CWND serves as a congestion window and is decreased under certain conditions, such as the receipt of an ECN bit. According to the TCP standard, the use of ECN is always in combination with retransmission protocols that are engaged to overcome blockages and interference. However, the incompatibility of ECN with ARQ leaves a need for a solution to the combined congestion and interference problem.

Forward error correction also can be employed to simply 'code through' any outage length with the proper selection of code, code length and interleaving technique. This technique is not acceptable because of the inherent delay and traffic rate reduction required to compensate for losses due to long periods of degradation. For example, in a system subject to degradations of variable duration, the system designer would need to select a coding technique robust enough to compensate for the longest period of degradation. This coding, however, will result in unnecessary delay and/or lowered data rate during the times in which only short periods of degradation occur.

One solution to the foregoing problems lies in a TCP-based technique having a performance enhancing proxy (PEP) that serves to increase the performance of network protocols over degraded communication links. That TCP-PEP uses an effective retransmission protocol that is integrated into a performance enhancing proxy in order to compensate for degraded communication links. The TCP-PEP retransmission technique is modified and supplemented by additional features related to control of congestion, window size, connection negotiation, and accelerated establishment.

SUMMARY OF INVENTION

The invention concerns the integration of an improved retransmission protocol into a performance enhancing proxy (PEP) for degraded communication links. Various embodiments of the invention include congestion control, window size algorithms, connection negotiation, and connection establishment acceleration.

In particular, the invention concerns a method of implementing a retransmission protocol in a TCP network having plurality of wireless links, including at least one link between a first terminal and a second terminal, where each of said terminals supports a first TCP retransmission protocol and at least one of said first and second terminals also supports a second TCP retransmission protocol which is different from the first retransmission protocol. The method comprises at each station, making a first determination of whether the first protocol is supported, and at each station supporting the first protocol, making a second determination of whether said second protocol is to be utilized. Then, at each station, at least information regarding the first determination is inserted into a call setup packet. At each of the first and second terminals, the call setup packet is transmitted to the other of said first and second terminals and at the other first and second station, a third determination is made as to whether the second TCP retransmission protocol is supported by both first and second terminals. Finally, in response to the third determination, one of the first and second TCP protocols is implemented.

The invention also involves a method of implementing a retransmission protocol in a TCP network having a plurality of wireless links including at least one link between a first terminal and a second terminal, where each terminal supports a TCP retransmission protocol having a variable size window. The window size is varied according to a size variation protocol. The method comprises establishing a window size increment value and changing the increment value on the basis of detected congestion and indicia of successful transmission and reception of packets.

In accordance with still further features of the invention, the method comprises increasing or decreasing one or both of the window size and increment value on the basis of transmission history.

In accordance with yet another feature of the invention, the method comprises use of a reorder count that permits a specified number of out of order packets to be outstanding before remedial action, including retransmission and adjustment of window size and increment value, is undertaken.

BRIEF DESCRIPTION OF THE DRAWINGS

The present invention is illustrated by way of example, particularly a preferred embodiment best mode, and not by way of limitation. Further objects, features and advantages of the present invention will become more clear from the following detailed description of a preferred embodiment and best mode of implementing the invention, as shown in the figures of the accompanying drawing, in which like reference numerals refer to similar elements, and in which:

FIG. 9 is a chart illustrating the ramp up of CWND according to the present invention.

FIG. 10A an illustration of a TCP SYN packet used during connection setup and FIG. 10B is an illustration of a flowchart for determining whether to use the improved or conventional TCP protocol.

Figure 1:
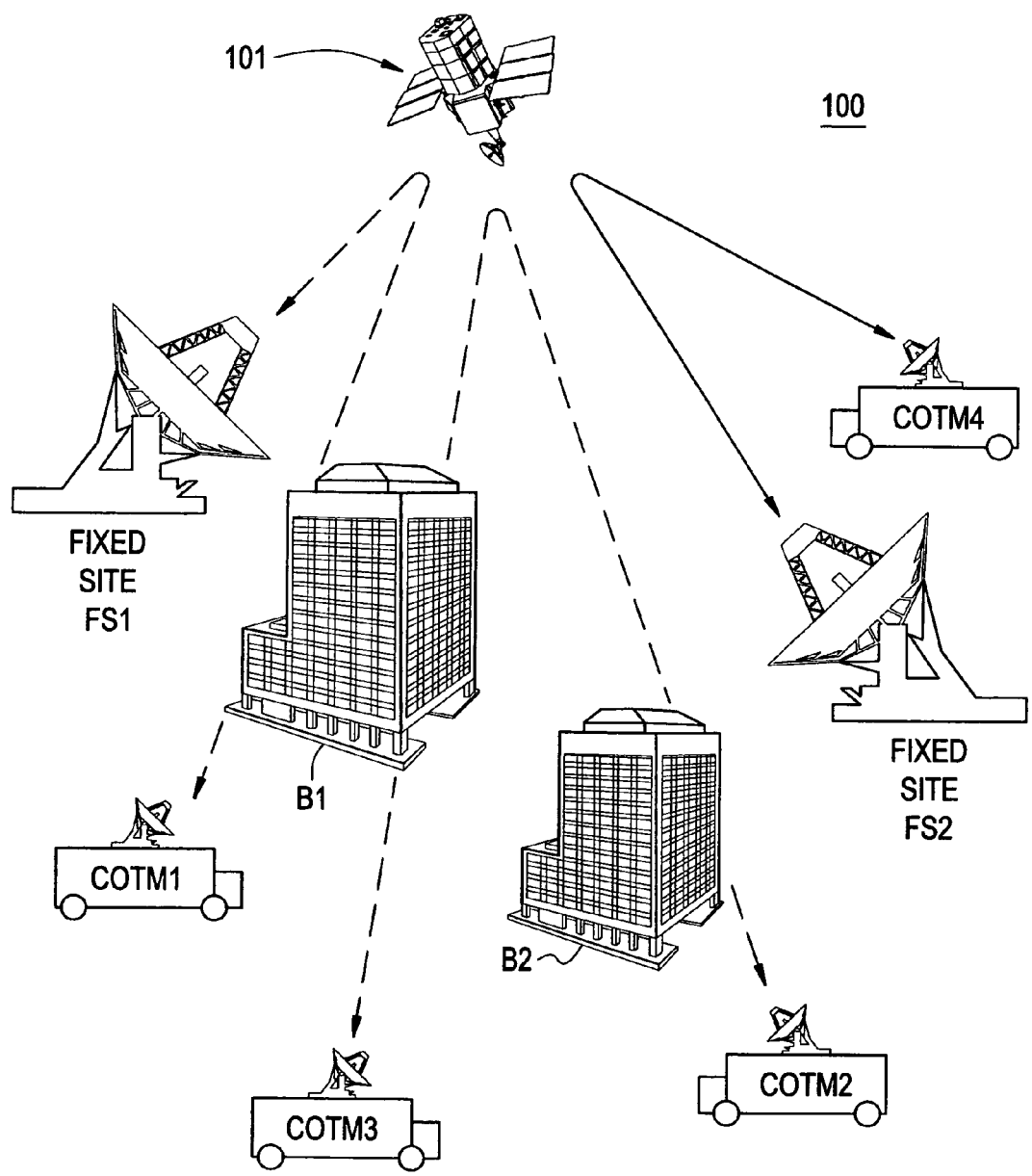
FIG. 1 is an illustration of a wireless communications system to which the invention is applicable.

DESCRIPTION OF EXEMPLARY
EMBODIMENTS OF THE INVENTION

In the following description, for the purposes of explanation, numerous specific details are set forth in order to provide a thorough understanding of the broader aspects of the present invention, as well as to appreciate the advantages of the specific details themselves according to the more narrow aspects of the present invention. It is apparent, however, to one skilled in the art, that the broader aspects of the present invention may be practiced without these specific details or with equivalents determined explicitly herein or in accordance with the guides set forth herein. Well-known structures and devices are shown in block diagram form in order to avoid unnecessarily obscuring the present invention with unnecessary details.

The present invention is also capable of other and different embodiments, and its several details can be modified in various respects, all without departing from the spirit and scope of the present invention. The drawing and description are illustrative and not restrictive. In the following description of the exemplary embodiments, the same reference numbers or characters may be used in different figures where the structures or features are the same and a common description of such structures or features would be applicable to all. However, the use of different numbers for a similar structure or feature in one figure does not necessarily mean that it is different from a similar structure or feature in another figure.

The present invention is appropriate for a wide range of network protocols and degraded channels, but for purposes of providing an exemplary and currently applicable embodiment, it will be described with respect to the Internet's Transmission Control Protocol (TCP). The exemplary embodiment assumes the existence of system of the type illustrated in FIG. 1 where there is one or more degraded wireless communication links that rely on a satellite link through a geostationary satellite. The exemplary signal degradation will be outages due to the use of Communication on the Move (COTM) terminals, but it need not be limited to such outages, as they can be the result of weather and RF or other interference. Outage characteristics of different types of environments (open and urban) are described in "EHF Satellite Communications-on-the-Move Blockage Channel Modeling" H. Yao, MIT Lincoln Laboratory Technical Report 1098, 2 November 2004. While a single satellite is depicted for clarity, the application of the invention to a system with multiple satellites and inter-satellite links is also contemplated. The satellites can be simple relay (bent pipe) or more complex processing satellites.

Figure 4:
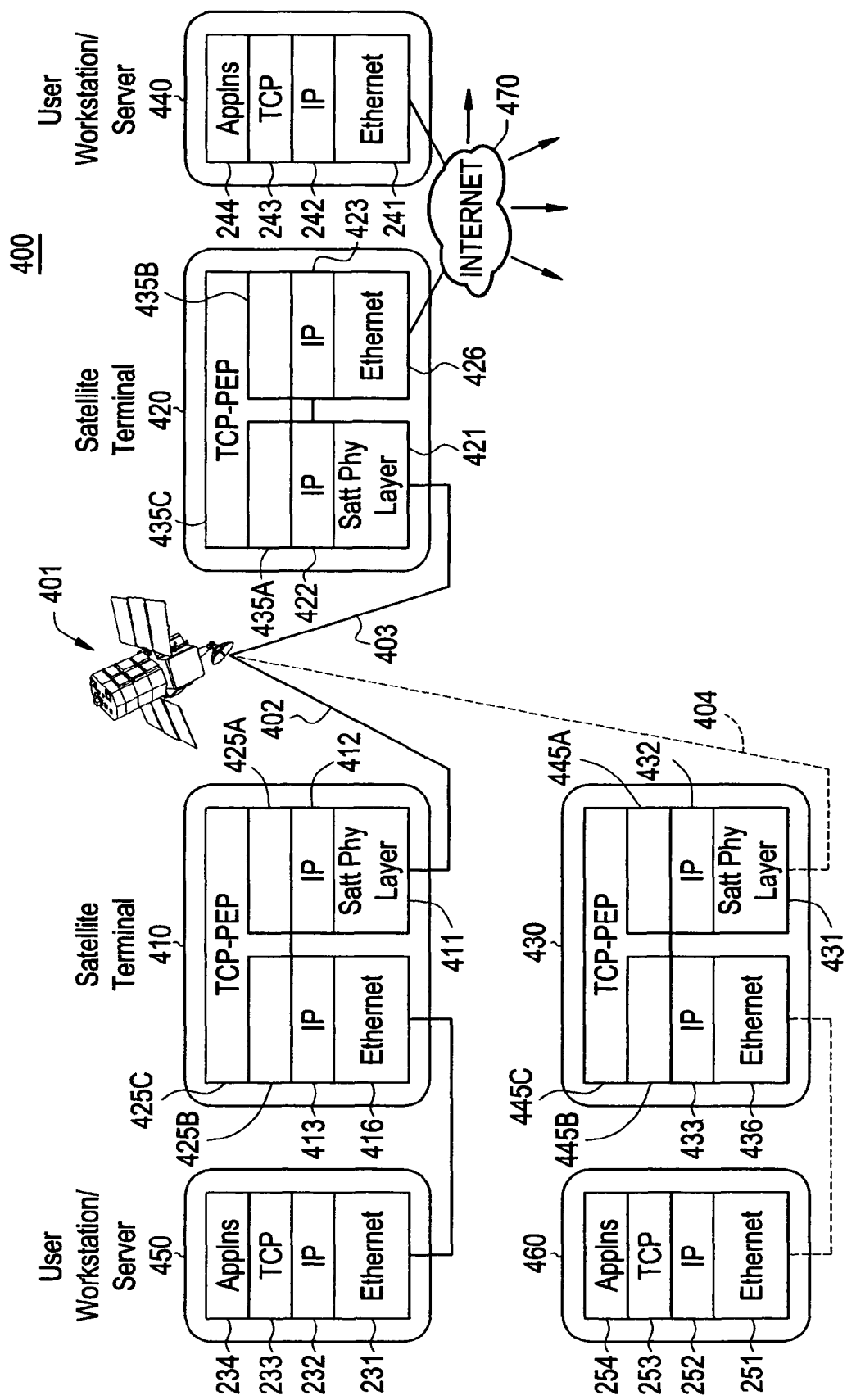
FIG. 4 is an illustration of an exemplary satellite based TCP/IP communication network, having plural satellite terminals that are in communication with a satellite over wireless links and are adapted to use performance enhancing proxy techniques.

FIG. 4 illustrates an exemplary IP wireless network 400, which provides communication via satellite 401 between satellite terminals 410, 420, 430 via links 402, 403, 404, respectively. Each satellite terminal 410, 420, 430 is coupled to a representative user workstation or server 440, 450, 460, respectively, to enable workstations and servers in a network to communicate among each other directly or via the Internet 470. A network as illustrated may support multiple satellite terminal/user terminal combinations, as indicated by the illustration of the combination of satellite terminal 430 and user workstation/server 460 with a dotted line. As with the terminals illustrated in FIG. 2, user applications communicate bi-directionally across the network to server applications-through layered network connections. The satellite terminals use the IP layer to interface the satellite physical layer to the Ethernet physical layer. Specifically, the satellite terminals 410, 420, 430 have satellite physical layers 411, 421, 431 that couple to a respective link 402-404, IP layers 412, 422, 432 that couple to the satellite physical layers, and IP layers 413, 423, 433 that couple to Ethernet layers 416, 426, 436. The workstations 440, 450, 460 similarly have Ethernet layers 231, 241, 251, IP layers 232, 242, 252, TCP layers 233, 243, 253, and Application layers 234, 244, 254. Within the satellite terminal, however, between the IP layers, a TCP satellite layer 425A, 435A, 445A and TCP terrestrial layer 425B, 435B, 445B is linked by a TCP performance enhancing proxy (PEP) layer 425C, 435C, 445C.

The TCP-PEP feature can be installed in a satellite hub, integrated into the terminal as shown, or separately implemented between the satellite terminal and the Internet and coupled to a router. The TCP-PEP feature substitutes for the conventional ARQ-T or ARQ-S and retransmits lost packets between terminals, particularly where one or both terminals are COTM terminals. The TCP-PEP feature uses an enlarged window over the satellite network and uses TCP with RFC1323 extensions as the protocol over the satellite link. TCP-PEP also provides local TCP acknowledgements to a workstation or host PC and uses an optimized TCP protocol over the satellite network. The TCP-PEP feature is used between every pair of terminals, COTM or fixed, and a TCP-PEP session is dynamically established for each user.

In an operation of the TCP-PEP as applied to a satellite network as illustrated in FIG. 4, the end-to-end TCP connection is broken into 3 concatenated transport layer connections. Data from the user TCP instance is acknowledged by the TCP instance in the local satellite terminal. Data is transported across the satellite network using a separate TCP-like transport layer connection, which typically uses a window that is sized for the satellite bandwidth-delay product.

Figure 2:
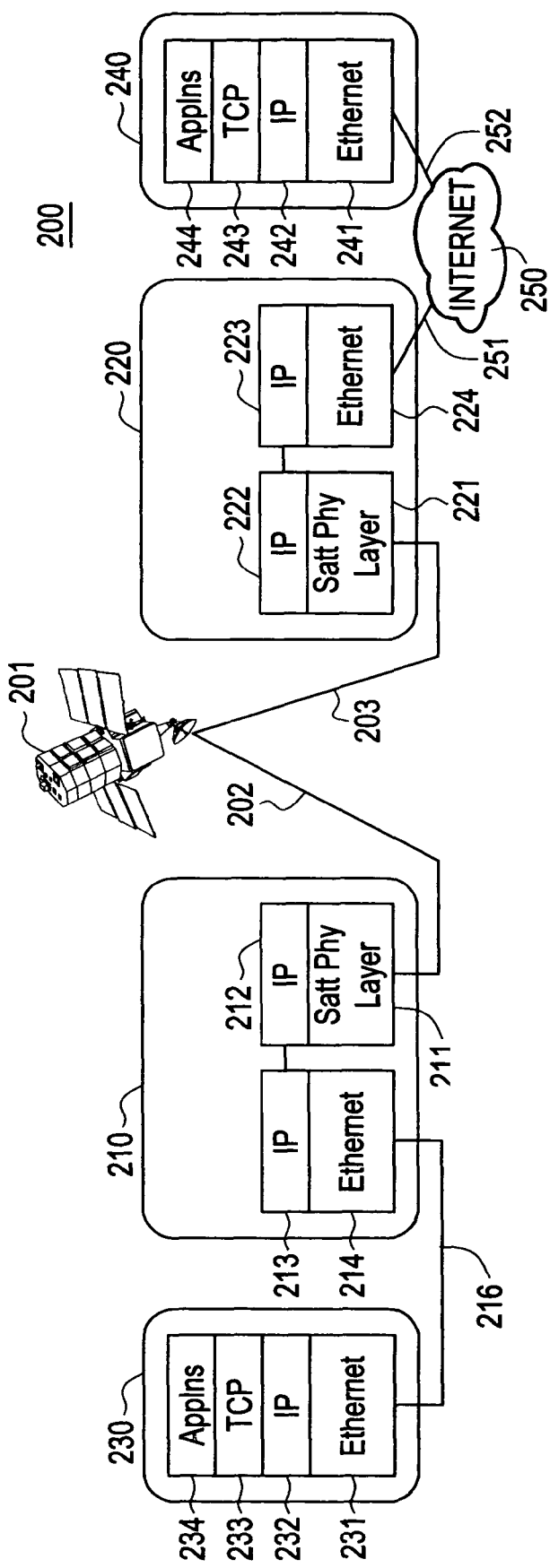
FIG. 2 is an illustration of a conventional satellite based TCP/IP communication system.
Figure 3:
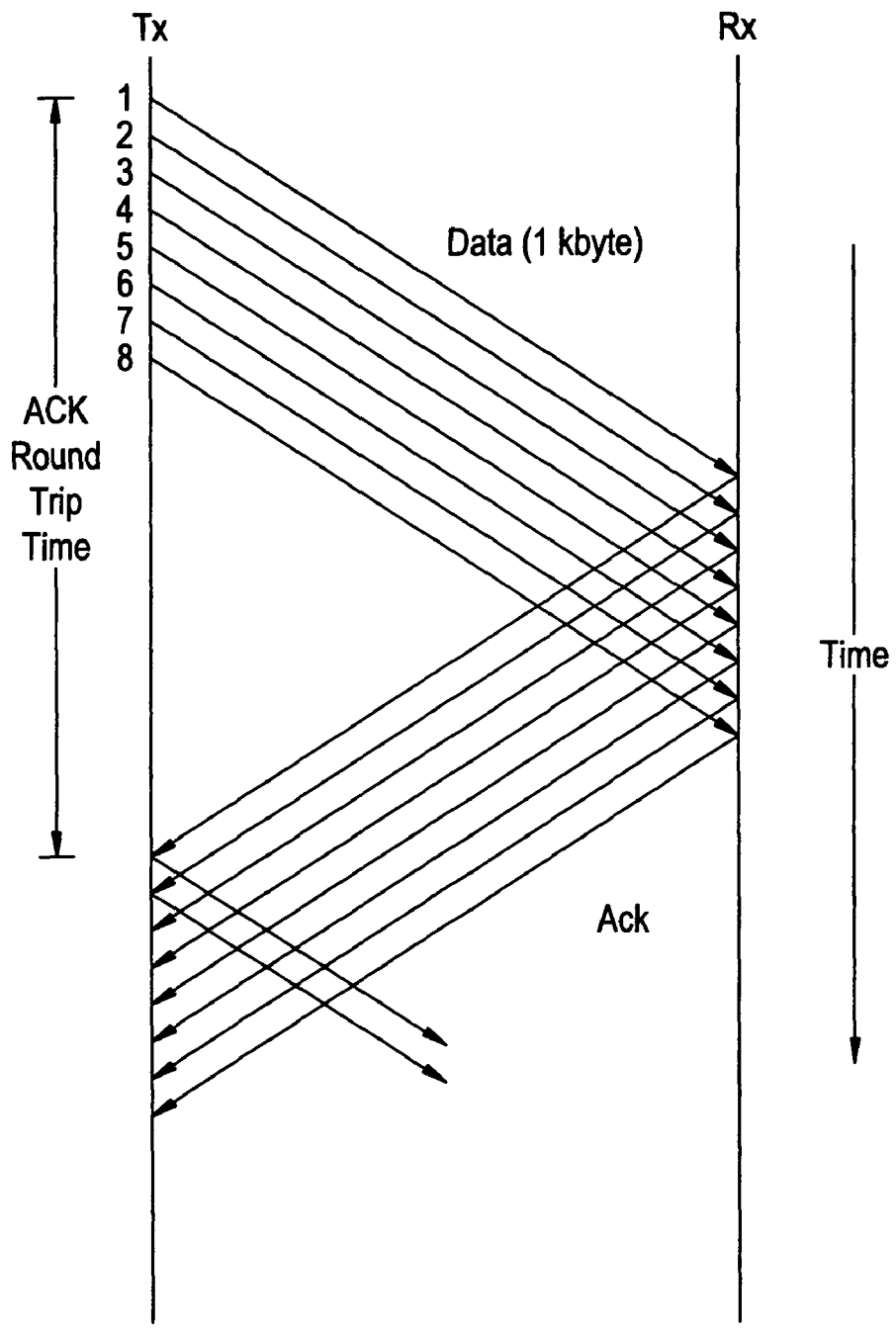
FIG. 3 is an illustration of signal flows involved in packet transmission and acknowledgment for a wireless communications link via satellite.
Figure 5:
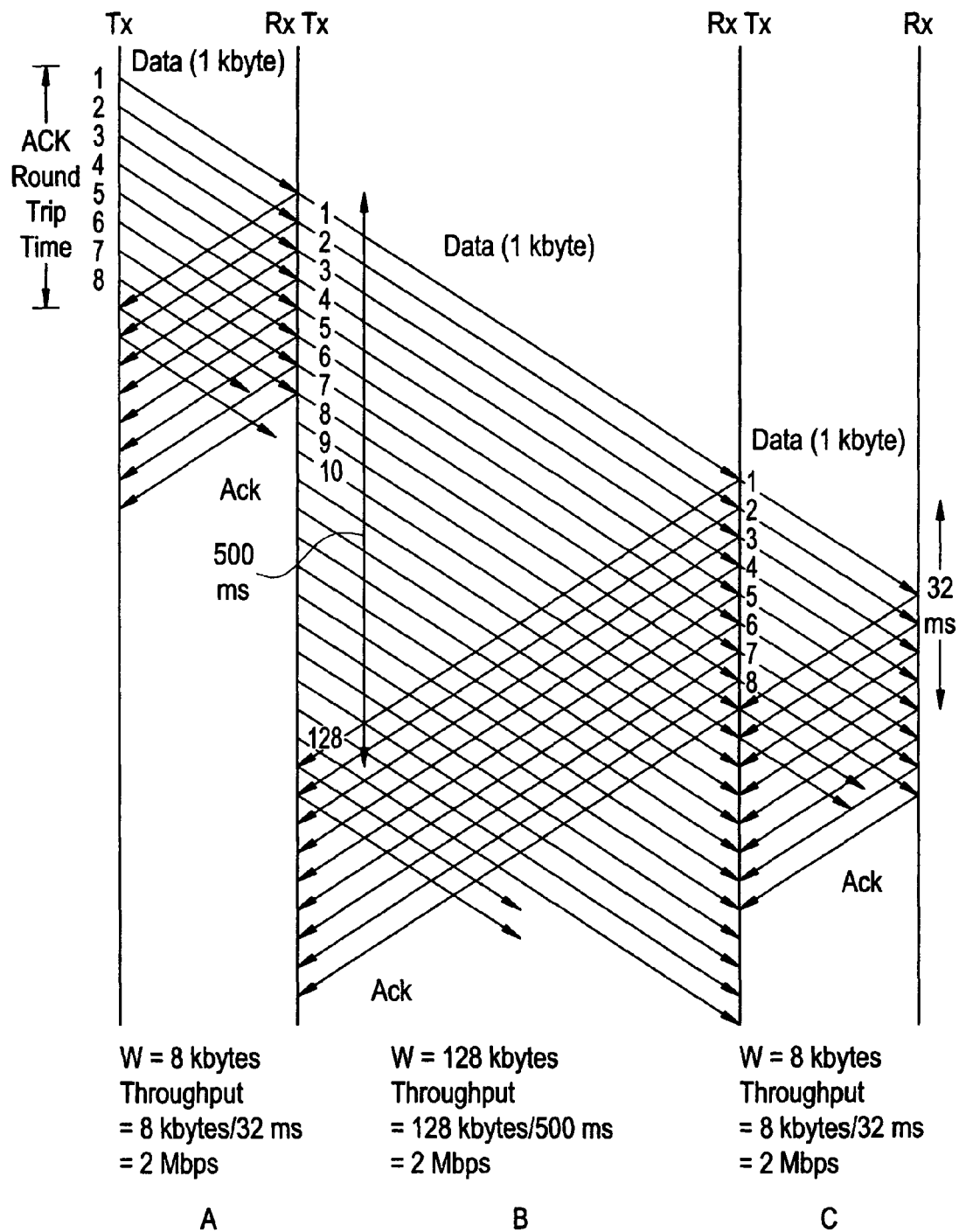
FIG. 5 is an illustration of signal flow among transmitters and receivers at workstations and satellite terminals in a satellite based TCP/IP communication system using performance enhancing proxy techniques.

The result of a TCP-PEP implementation in a satellite system of FIG. 4 may be understood from the illustration in FIG. 5, where in contrast to the standard system in FIG. 2, a 2 Mbps TCP throughput is achieved using TCP-PEP, even when end-user TCP implementations use 8 kbyte windows. As in FIG. 2, data transmissions are in 1 kbyte packets with eight packets being transmitted within approximately one roundtrip time. Column A in FIG. 5 represents the communication between the workstation and the satellite terminal, possibly over the Internet, and utilizes a window of 8 kbytes with an ACK round trip time of 32 ms, yielding a throughput of 2 Mbps. Column B in FIG. 5 represents the communication between the satellite terminals, and utilizes a window of 128 Kbytes with an ACK round trip time of 500 ms, as is typical for geostationary satellite communications. The throughput is also 2 Mbps. Column C in FIG. 5 represents the communication between the satellite terminal and work station, and as in column A, has a throughput of 2 Mbps. Indeed, with the insertion of TCP-PEP functions at the satellite terminal, without requiring any change in the end user equipment or software, the throughput can be as high as the satellite link rate, e.g., up to 100 Mbps.

Figure 6:
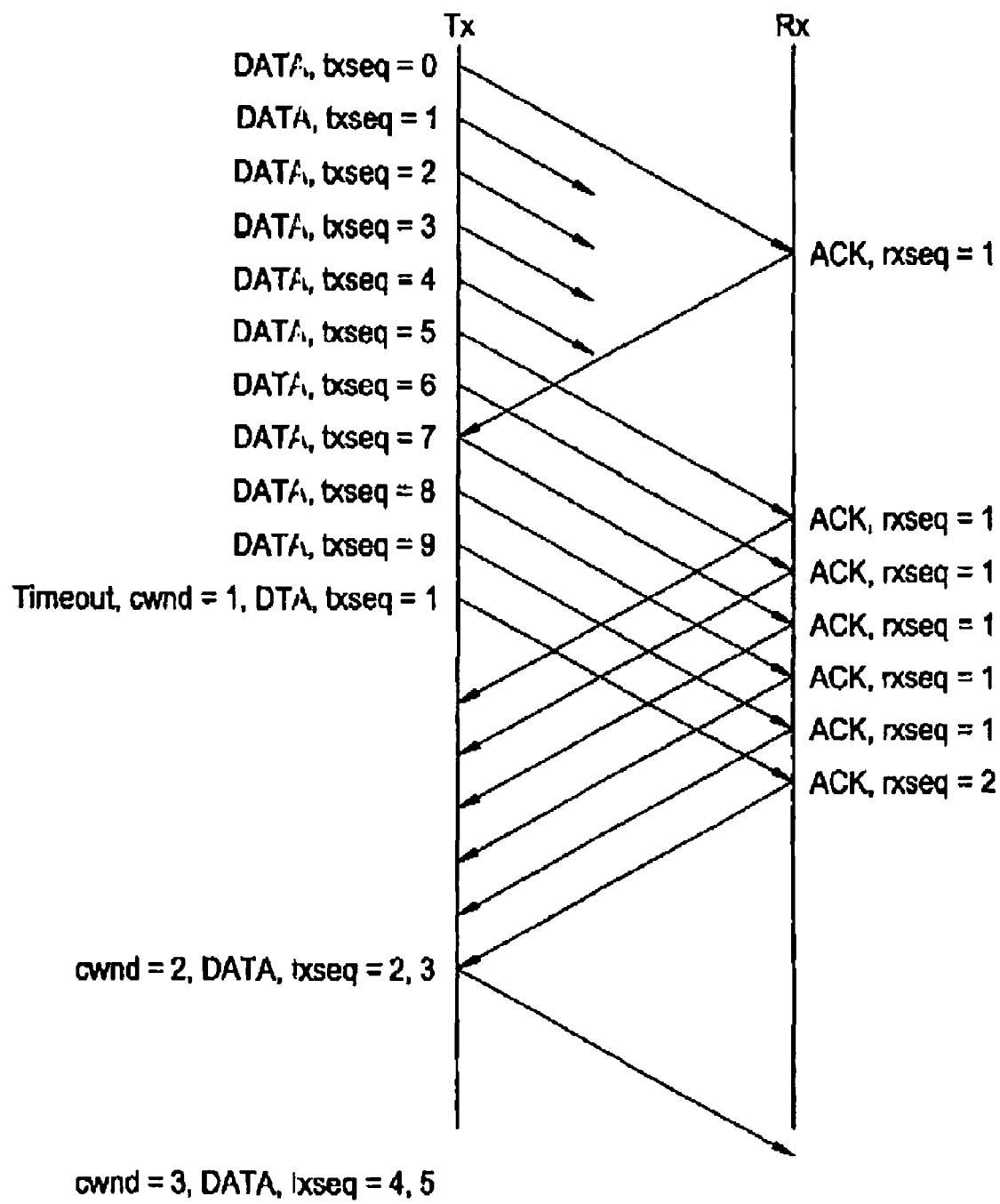
FIG. 6 is a time sequence diagram that illustrates signal flow in a conventional TCP network using a conventional retransmission technique for missing packets.

FIG. 6 is a time sequence diagram that illustrates the operation of the TCP-PEP on a channel that experiences a disruption that causes the loss of four 1-kbyte packets. Time flows down the page, and the originating terminal is designated Tx (on the left) and the receiving terminal is on the right (Rx). The transmitting terminal starts the transfer by sending data packets with transmit sequence (txseq) numbers 0-9. The delay time for these packets across the satellite link is illustrated by the downward sloped lines, and the interrupted lines for txseq=1-txseq=4 indicate that these packets are lost on route to the Rx terminal. Note that Tx continues to send packets txseq=5 up to txseq=9, implying that a congestion window CWND value at this initial point is greater than or equal to 9. Packets with txseq=5 to txseq=9 are all successful (in this illustrative example, the channel impairment has disappeared by this time).

Once Rx receives txseq=0, it replies with an acknowledgement ACK rxseq=1, indicating that the next packet it is ready to receive is txseq=1. The line for this responding ACK for packet txseq=0 reaches the Tx, indicating that txseq=0 has been received. However, since none of packets txseq-=1 to txseq=4 generate ACK packets at the Rx, based on the standard TCP protocol, after the packet with txseq=9 is transmitted, Tx experiences a TCP timeout. It notes the last rxseq that it received (rxseq-1) and thus retransmits packet txseq=1. The TCP congestion window CWND value is now reduced to 1 packet, so Tx must wait for an ACK for the retransmitted packet corresponding to txseq=1 before it transmits again.

In the meantime, Rx can receive successful packets txseq=5-txseq=9. Each of these packet receptions causes an ACK to be returned, but the next packet in sequence needed by Rx still remains txseq=1, so the same ACK is transmitted back to Tx for each of the received packets txseq=5 to txseq=9. Tx ignores the ACKs corresponding to packets txseq=6-txseq=9, since all also have rxseq=1. Only after the successful reception of packet txseq=1 does Rx transmit an ACK with rxseq=2.

As illustrated, the packet txseq=1 is successfully received at Rx and an ACK with rxseq=2 is generated. Since the value of CWND is only 1 due to the reduction caused by the lost packet, Tx waits for the ACK rxseq=2 before sending any other packets. Upon receipt of ACK rxseq=2, the value of CWND is increased to 2 and Tx sends the next two of the lost packets, txseq=2 and txseq=3. It is assumed here that these ACKs arrive within the timeout period of the TCP, so that the congestion window CWND is increased to 3 and packets txseq=4 and txseq=5 are subsequently transmitted. The figure does not show any further communications, although it is implicit that these next packets will be acknowledged and the data transfer will continue. Note that packets with txseq=5 to 9 will all be retransmitted even though they were successfully received the first time.

The foregoing TCP-based retransmission protocol does not provide a desired level of efficiency, since there are readily apparent delays in waiting for returned ACKs and because the congestion window CWND is subject to immediate reduction to a minimum level of 1 packet upon detection of a loss and because the increase in the window size is slow, being performed only on the basis of successful completion of round trips of a packet transmission and an acknowledgment of receipt.

The foregoing approach is useful where there is an assumption that there are not too many packet losses. Such assumption is valid where the network connections are over reliable terrestrial links or even over satellite links where there is little interference, as with fixed station to satellite communications. Improvements can be made to the performance of the system by using a large initial window, supported by large storage capability to collect out of sequence packets, and by increasing the window faster as ACK packets are successfully returned, based on confidence in the reliability of the system. However, this approach may not be suitable where there are mobile COTM terminals and where congestion is possible.

An improvement to the above retransmission protocol can overcome these problems and achieve important goals, particularly where both congestion and interference problems are likely to be encountered. First, the improved retransmission protocol enables the communicating nodes to determine quickly if packets have become lost in transit. Second, the improved retransmission protocol avoids unnecessary retransmissions to minimize latency and keep the channel loading to a minimum. With the improved protocol, there are no spurious retransmissions and no RTT timeout based retransmissions. Also, the transmissions are insensitive to delay and delay-variance, and insensitive to link layer ARQ, if any. The average throughput that can be achieved approaches 1-packet_loss_rate.

In achieving these goals, the retransmission protocol uses ACK (positive acknowledgment) and NACK (negative acknowledgment) signaling selectively, rather than using such signaling for each packet as in FIG. 6. It also allows use of a large number of ACK/NACK signals per ACK packet. In particular, every packet is assigned a send sequence number txseq, as in conventional TCP, but a time sequence value Tseq is also maintained at the transmitter. This sequence number is incremented whenever a packet is transmitted or retransmitted, and the current time sequence value is saved locally for each packet whenever it is transmitted or retransmitted. The receiver sends acknowledgement packets, using the same rules as conventional TCP. However, there are additional packets generated and transmitted in order to efficiently convey transmission and reception information.

For example, every N packets, where N is an integer (e.g., N=4), a STATREQ packet is sent by the transmitter to the receiver. The STATREQ packet contains (1) the time sequence number, txTseq, and (2) the highest sequence number sent, txSseq plus 1. The STATREQ packet is also sent whenever TstatReq1 seconds (e.g., 0.1 seconds) have elapsed since the last STATREQ packet was sent, and some data remains unacknowledged. The STATREQ packet is also sent whenever TstatReq2 seconds (e.g., 5 seconds) have elapsed since the last STATREQ packet was sent, and no data remains unacknowledged. The STATREQ information can be piggybacked on a normal data packet, when possible. Thus, within a roundtrip time RTT, several STATREQ packets may be sent. The values of TstatReq1 and TstatReq2 are system design parameters that may be set on the basis of one round trip time and/or other system parameters as would be understood by those skilled in the art.

The following features are implemented as rules for the retransmission protocol.

Whenever a receiving terminal receives an out of sequence packet whose sequence number is larger than the largest sequence number received, the receiving terminal sends a USTAT packet to the transmitting terminal, identifying the sequence numbers of the missing packets, the sequence numbers of the received packet and the normal acknowledgment sequence number. This step may optionally be skipped if the network is expected to re-order packets.

Whenever, the receiving terminal receives a STATREQ packet, it sends to the transmitting terminal a STAT packet, which contains the received time sequence number, the sequence number for all the missing packets, the sequence numbers of all received packets and the normal acknowledgement sequence number.

Whenever the transmitting terminal receives a USTAT packet, it frees up acknowledged packets and retransmits to the receiving terminal the missing packets identified in the USTAT packet.

Whenever the transmitting terminal receives a STAT packet, it frees up acknowledged packets and retransmits to the receiving terminal the missing packets identified in the STAT packet, if the time sequence value saved for the packet is less than the time sequence value received in the STAT packet. If the network is expected to re-order packets, then the last comparison is done with the time sequence value received in the STAT packet minus a REORDERCOUNT value, which represents the number of packets that may be received out of order (and surely reassembled into a proper order), before it is determined that a packet loss has occurred and that further transmission may be halted. A value of REORDERCOUNT=3 is recommended and is similar to that which is used in standard TCP.

In accordance with an exemplary embodiment of the subject invention, every packet is assigned a send sequence number txseq, as is done in normal TCP.

A time sequence txTseq counter is maintained at the transmitter, which is incremented whenever a packet is transmitted or retransmitted. The time sequence number txTseq will start at zero for the first packet of a transmission and will increment every time a packet is transmitted, whether or not that packet was an original transmission or a retransmission. Thus, if no packets need to be retransmitted, txTseq will always be the same as txseq. The receiver sends traditional acknowledgement packets, using the same rules as normal TCP.

In normal TCP, the retransmission timer is based on the round trip time RTT and is doubled on every timeout. Retransmissions are done whenever the retransmission timer expires. However, according to the exemplary embodiment of the invention, the TCP retransmission timer is used only during connection setup. For data retransmissions, the periodic STATREQ packets are used, which are not related to round-trip-time.

Figure 7:
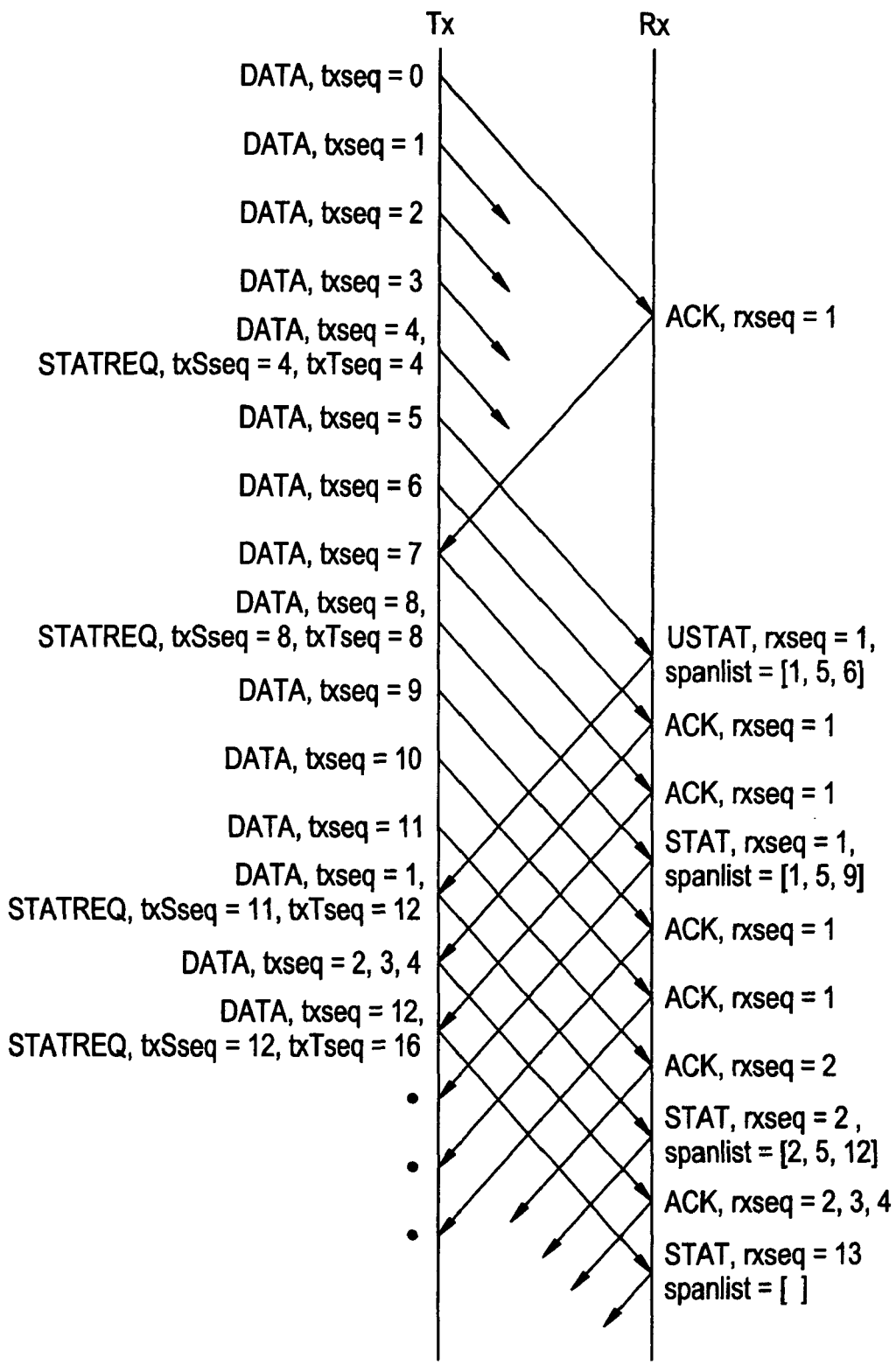
FIG. 7 is a time sequence diagram that illustrates signal flow in an improved TCP network using an improved retransmission technique for missing packets in accordance with the present invention.

FIG. 7 is a time sequence diagram that illustrates the operation of an exemplary embodiment of the retransmission aspect of the present invention for the same degraded channel as used in FIG. 6. The transmitting terminal in this example sends a STATREQ every 4 packets starting with packet txseq=4.

The transmitting terminal Tx starts the transmission by sending packet txseq=0 and the transmission is received at the receiving terminal Rx and acknowledged by transmission of ACK and rxseq=1 to Tx. As in FIG. 6, subsequent data packets txseq=1 to txseq=4 are sent, but the transmission is blocked by interference. One difference is that the latter transmission of txseq=4 is accompanied by a STATREQ with txSseq=4 (indicating that the highest packet sequence number txseq, sent so far is txseq=4) and txTseq=4 (indicating that a total of 4 packet transmissions—original (4 transmissions) or retransmissions (0 transmissions)—have occurred).

The transmitting terminal Tx then sends data packets with transmit sequence (txseq) numbers 5-8 as in the previous case of FIG. 6. Packet txseq=8 follows txseq=7 and now also contains the STATREQ with txSseq=8 (indicating that the highest packet sequence number, txseq, sent so far is txseq=8) and txTseq=8 (indicating that a total of txTseq+1=8 packet transmissions—original or retransmissions—have occurred). The broken lines for txseq=1-txseq=4 (including the STATREQ) indicate that these packets are again lost on route to the receiving terminal Rx. Notwithstanding the loss of packets, the transmitting terminal Tx continues to send new packets up to txseq=11.

Once Rx receives txseq=0, it replies with an acknowledgement ACK with rxseq=1, indicating that it has successfully received the packet sequence up to txseq=0.

The next successful packet at the receiver is txseq=5. This out of order packet causes Rx to issue a USTAT packet with rxseq=1 (indicating that it has successfully received the packet sequence up to txseq=0). It also issues a spanlist [1,5, 6] that, as will be detailed later, indicates that packets with txseq=1 to txseq=4 are missing, and the packet with txseq=5 has been received. The listing of 6 does not indicate that 6 has been received but merely serves as marker for the end of the span list.

Next, Rx successfully receives packets txseq=6 and txseq=7. The next packet in sequence needed by Rx still remains txseq=1. Thus, the identical ACK is transmitted back to Tx (with rxseq=1) in response to both packet receptions for txseq=6 and txseq=7. Next, Rx receives data packet txseq=8 with STATREQ, txSseq=8 and txTseq=8. Rx responds with a STAT message with spanlist [1,5,9], indicating that it has successfully received packets up to txseq=8, but is still missing packets with txseq=1 to txseq=4. This STAT message also has rxseq=1, since the next packet in sequence needed by Rx still remains txseq=1.

Rx subsequently receives packets with txseq=9 to txseq=11. The next packet in sequence needed by Rx still remains txseq=1 upon the reception of these packets, so again an ACK identical to the previous ACK (with rxseq=1) is transmitted back to Tx in response to these packet receptions for txseq=9 to txseq=11.

After the packet with txseq=11 is transmitted, Tx receives the USTAT identifying which packets have been lost (1 to 4). It notes the first packet that has been lost and retransmits that packet, txseq=1. As well, txTseq is now 12, a multiple of 4, so Tx piggybacks a STATREQ with the data packet. For this STATREQ, txsseq is 11, since the transmit packet with the highest sequence number already transmitted has txseq=11.

Tx subsequently retransmits packets with txseq=2 to txseq=4. Meanwhile, Tx receives and ignores the ACKs corresponding to packets txseq=6 and txseq=7 (both have rxseq=1). It further receives and ignores the STAT resulting from the STATREQ of packet with txseq=8, since the spanlist [1, 5, 9] gives no new information about unsuccessful packets. Likewise, Tx receives and ignores the ACKs corresponding to packets txseq=9 to txseq=11, since they all still have rxseq=11.

After Tx has re-transmitted the last of the known lost packets (txseq=4), it continues transmitting the next packet in order, txseq=12. This transmission packet coincidently has txTseq=16 (indicating that a total of txTseq+1=17 packet transmissions—original or retransmissions—have occurred). Since txTseq is a multiple of N, where N=4, a STATREQ is transmitted along with data packet txseq=12. This STATREQ has txSseq=12 (indicating that the highest packet sequence number, txseq, sent so far is 12) and txTseq=16. Tx finishes its transmissions in this example by subsequently sending packets with txseq=13 and txseq=14, respectively (not shown).

When Rx receives the retransmission of data packet txseq=1 and its STATREQ with txTseq=11 and txSseq=12, it notes that it has now completely received the transmission sequence up to txseq=1 and thus will set rxseq=2 and respond with a STAT containing spanlist [2, 5, 12] since the known packet gap is now only from txseq=2 to txseq=4, and packets txseq=5 to txseq=11 have been successfully received. As Rx receives the retransmitted packets txseq=2 to txseq=4, it replies with ACKs containing rxseq=2 to rxseq=4, respectively.

When Rx receives packet txseq=12 and its STATREQ, it notes that it has now completely received the transmission sequence up to txseq=12 and thus sets rxseq=13 and responds with a STAT containing spanlist [ ]. While not shown, it responds to the last two receptions of packet txseq=13 and txseq=14 with ACKs containing rxseq=14 and rxseq=15, respectively.

In the foregoing description of the retransmission protocol that embodies an aspect of the present invention, a listing of received packets that bound missing packets was used and were called "spanlists." Spanlists embody one technique to specify which packets have (or have not) been successfully received. If all packets known (at the receiver) to be transmitted have been received, then the spanlist will be null. If a single gap is known, then a two element spanlist [a,b] will indicate that packets with txseq=a to b−1 are known to be lost. If another element is added to the spanlist, resulting in [a, b, c], then there still is an indication that packets with txseq=a to txseq=b−1 are known to be lost. Additionally, it is asserted that packets with txseq=b to txseq=c−1 have been successfully received. Each added element to the spanlist will alternatively identify a 'known missing' block or a 'known received' block. While this is one technique for representing missing or received blocks, there are many equivalent techniques such as sending the sequence numbers of all successfully received packets, although that alternate technique can result in large lists being sent that could dramatically increase the system overhead.

As noted previously with regard to FIG. 6, the standard TCP uses a window CWND that is a value retained at the transmitter and represents the number of packets that may have been transmitted and remain unacknowledged, before further transmission is halted. The size of the window correlates to the size of available memory to store transmitted packets, since those packets may have to be retransmitted if ultimately it is determined that they are lost. Where memory resources are limited, or where packet losses are expected due to interference or congestion, the CWND value or window size is initially small, and the reduction in CWND value upon loss of a packet is rapid, with the increase in CWND for successful round trip communications being deliberately slow. Specifically, the TCP-standard algorithm increases CWND by only one packet every RTT. This is especially problematic for high delay links, because the RTT is long because of the delay, independent of any congestion related delay. Even if there is an exponential increase in window size, which could increase the speed of any increase, the result would not be fair, in that older connections would be favored over younger connections.

Figure 8:
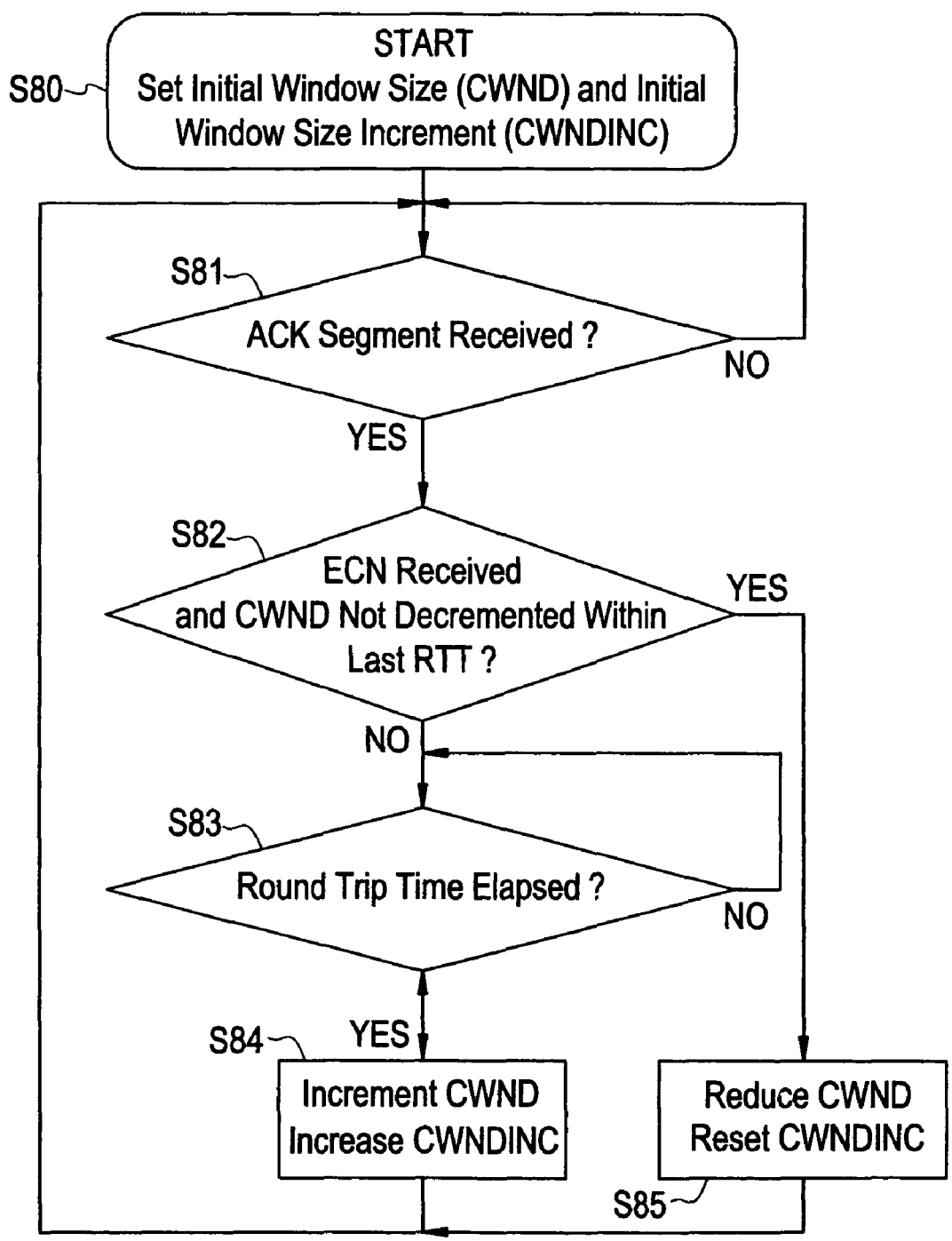
FIG. 8 illustrates a flow chart for a process that adjusts window size CWND using the improved TCP strategy.

The present invention dramatically modifies the standard TCP approach by incrementing window size rapidly on the basis of a determination that congestion is low. The modification in window size is designed to be fair across-multiple TCP connections. According to an exemplary embodiment for this feature of the invention, as illustrated with respect to the exemplary flow diagram in FIG. 8, at step S80 (START) the initial window size (CWND) is set (e.g., 2 or 8 packets). A window size increment variable (CWNDINC) is also set (e.g. 1 packet). At step S81, a determination is made at a transmitting terminal as to whether an acknowledgment by a receiving terminal of a transmitted packet (e.g., in the form of an ACK segment) has been received. The invention is not limited to the use of an ACK signal, and other ways of determining a successful receipt of a packet at a receiving terminal are known in the art. Upon determination that there has be a successful receipt (YES), a determination is made in step S82 as to whether (1) an ECN has been received at the transmitting terminal, indicating the existence of congestion in a manner known in the art, and whether CWND has not been decremented within the last round trip time. If the two conditions are met (YES), the process proceeds to step S85 and the window size (CWND) is reduced. In addition, the increment for window size increase (CWNDINC) is reset or, in an alternative approach, reduced by a predetermined amount. If the result of the determination in step S82 is NO, then a further determination is made in step S83 as to whether a round trip time has elapsed. If there is no congestion (step S82) and a round trip time has elapsed (step S83), then an aggressive operation of the system may be justified. In this case, CWND is additively increased by the then set value of CWNDINC, at step S84. Moreover, in the same step, CWNDINC is multiplicatively increased, for example, by a factor of FI (e.g, 1.5). The process is repeated thereafter with the value of CWND and the value of CWNDINC being changed every round trip time, unless congestion is encountered or an ACK segment is not received on time.

As noted, rather than relying on the receipt of an ACK packet, these increment rules can also be implemented using number of bytes instead of number of packets. Also, the rules can be based upon computations that are done on receipt of every ACK packet, instead of once per RTT. The algorithm provides a much faster ramp up of CWND than the TCP-standard algorithm. This is especially valuable for high delay links. Examples of CWND for RTTs from 0-10, with CWND increases until there is a reduction due to the existence of an ECN, followed by a renewed ramp up, are provided in the table illustrated in FIG. 9.

As already noted, the present invention increases network throughput by taking advantage of the fact that, in a degraded channel environment, packet loss may be attributed to channel impairment instead of being an absolute indicator of congestion. At any given time, up to CWND packets of unacknowledged data are allowed to be outstanding. It should be noted that acknowledged data is not counted in CWND for this purpose. Whenever a packet is retransmitted, CWND is not automatically changed. Thus, a CWND decrease on packet loss is suppressed. However, CWND is decreased on the basis of ECN and other congestion indicators. Optionally, CWND may be decreased upon packet retransmission, after which it is not decreased for one round trip time.

Specifically, since a transmitter or router may set an ECN bit in an IP header when congestion is detected, and an ECN notification is sent back to the transmitter by the receiver to advise of the existence of congestion, the transmitter can then adjust CWND according to a rule that causes it to be decreased by a multiplicative factor F (e.g, 0.5). However, CWND is not decreased subsequently for one round trip time RTT. Window size may also be decreased by a multiplicative factor F, if congestion is detected by other means, such as an increase in round-trip delay. CWND is not decreased subsequently for one round trip time. CWND is increased on receipt of an ACK packet according to applicable window increase rules.

If multiple packets are re-transmitted, they may be "paced" t seconds apart, where t=round-trip-time/CWND (in packets). Round-trip-time (RTT) is measured using normal TCP procedures (e.g., using the timestamp option in every data packet). Alternatively, if the improved retransmission protocol as exemplified by the illustration in FIG. 7 is used and a greater efficiency is achieved, round-trip-time may be measured using STATREQ and STAT packets only.

Figure 10B:
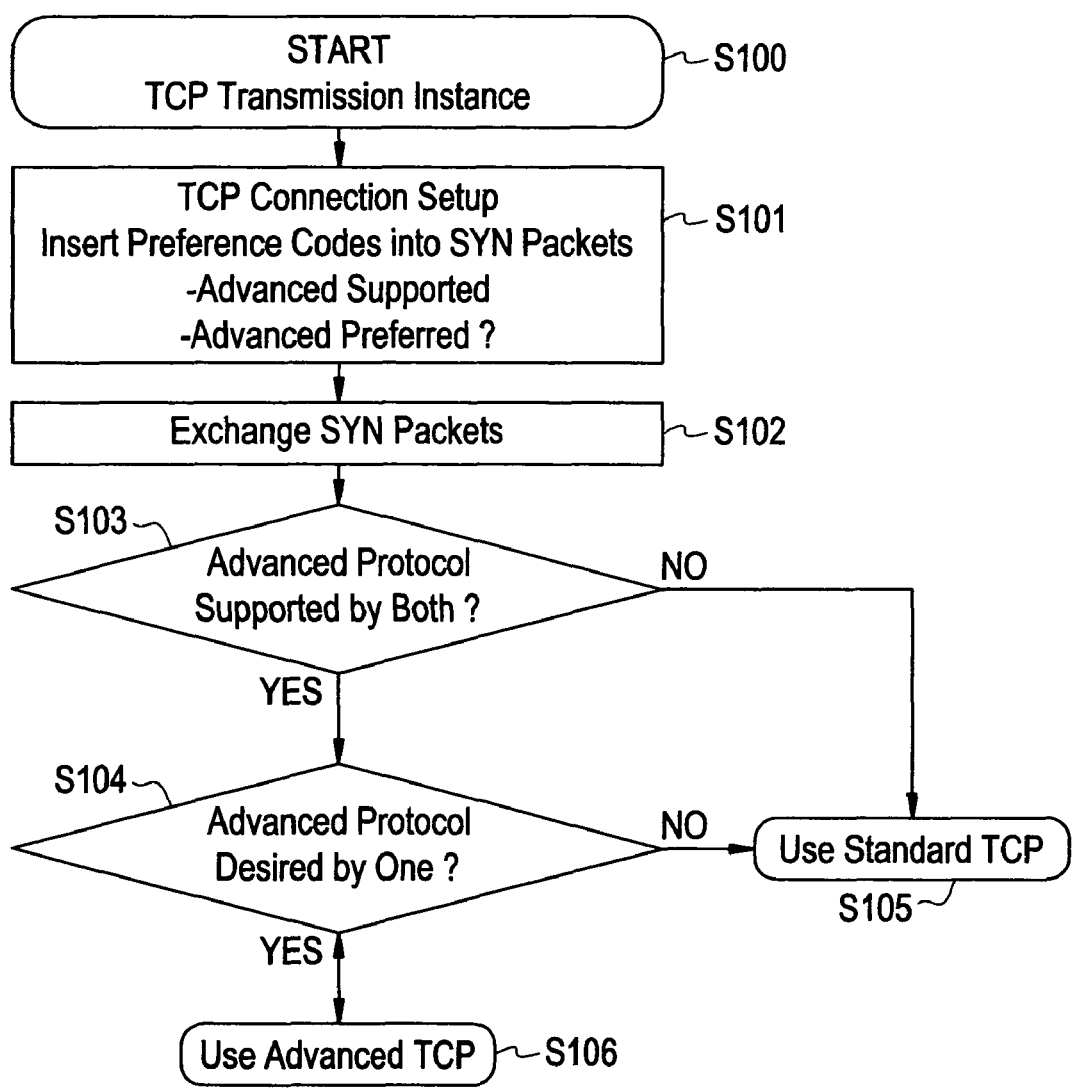

According to another exemplary feature of the present invention, each instance of the improved TCP (designated by the shorthand notation "TCP-XL") according to the present invention is configured with information related to whether (1) it can support the features of the invention and (2) whether it prefers the features of the invention. An illustration of these bits is provided in FIG. 10A. These two bits are exchanged in TCP call setup (SYN) packets. An algorithm for determining the use of the invention, based upon the input of the users at each end of a communication link, is illustrated in FIG. 10B and is initiated for each instance, as shown in step S100. The process for connection set up using the SYN packets proceeds at step S101 with an insertion into the SYN packet of two preference codes of the type illustrated in FIG. 10A. The codes are exchanged in step S102 and each user evaluates the information from the other user. In step S103, it is determined at a user terminal whether both sides of a communications link support the advanced retransmission protocol. If not, the normal TCP protocol is used at step S105 and the features and procedures of the advanced protocol are disabled. If both sides do support the protocol, and it is determined that at least one side prefers use of the advanced protocol in step S104, then the advanced protocol procedures are enabled in step S106. A user that has the capability to use the advanced procedure may choose not to do so for a variety of reasons. For example, a terminal that normally is mobile may be temporarily fixed. In this case the terminal would indicate that it did not prefer use of the enhanced TCP features during the time it was stationary, to minimize CPU time, channel overhead, etc. For recently used connections, the destination IP address and the results of the negotiation over use of the invention is saved in a local cache. This historical information may later be used at startup to implement the advanced protocol set up and connection procedures. Finally, the determination of whether to use the first or second protocol may be based upon congestion information, determined by the receipt of ECN information, delays in round trip time or other indicia of congestion.

In regular TCP, connection setup is done by a first terminal and a second terminal exchanging SYN packets. Where SYN packets are determined to be lost, due to the absence of a reply, the lost SYN packets are retransmitted after a timeout. The timeout value is set to 3 seconds initially, and doubled after every timeout. As a result, connection set-up time can get prolonged substantially on degraded links. Since data packets cannot be sent until connection set up and establishment is complete, the performance of the system is degraded. The advanced protocol uses-an improved TCP connection setup procedure that reduces connection setup time since, if it not known that the destination supports the improved TCP procedure, then the conventional TCP procedure is used. However, if it known that the destination supports the improved TCP procedure (e.g., based on the content of a cache or based on configuration), then the timeout value is set to a small duration (e.g., 0.1 seconds) and not changed for every retransmission. As a result, multiple SYN packets may be outstanding at any given time. If any of them are delivered to the receiver, then the connection establishment procedure can proceed to its next step.

Figure 11:
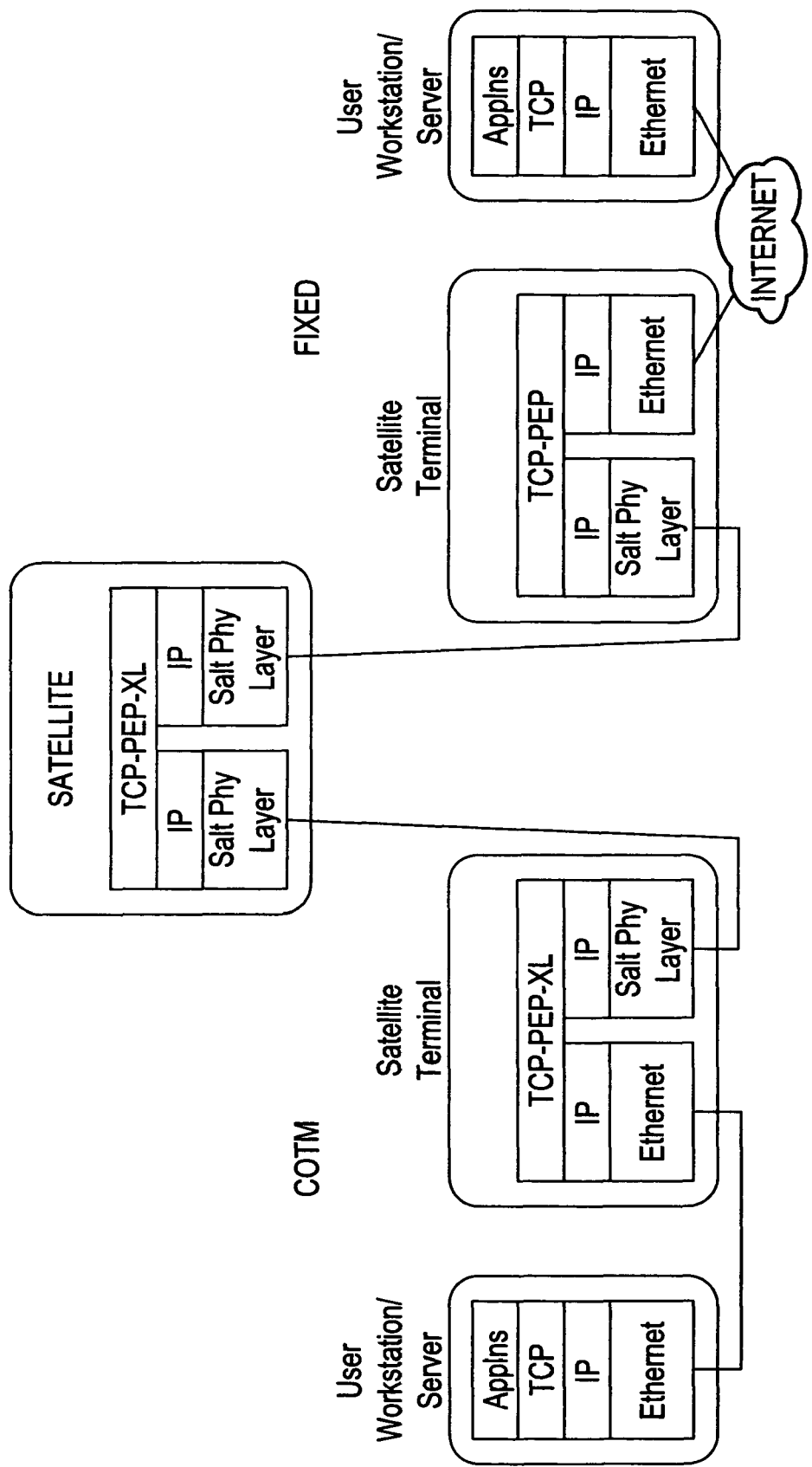
FIG. 11 an illustration of another exemplary satellite based TCP/IP communication network, having plural satellite terminals that are in communication with a satellite that has performance enhancing proxy equipment on board.

FIG. 11 is a block diagram of another exemplary system that may implement the improved TCP protocol, which is implemented in relevant terminals by a module designated as TCP-PEP-XL. In FIG. 11, the improved TCP features are contained in the COTM terminal that directly communicates over the outage prone (in this case, satellite) channel. The relay satellite in this case is a processing satellite that also contains an implementation of the improved TCP features. The satellite communicates with a network interface on the ground that, in this case, uses a traditional TCP-PEP, since this exemplary network interface terminal is fixed and thus not subject to outages or channel degradations in its direct path to the satellite.

Figure 12:
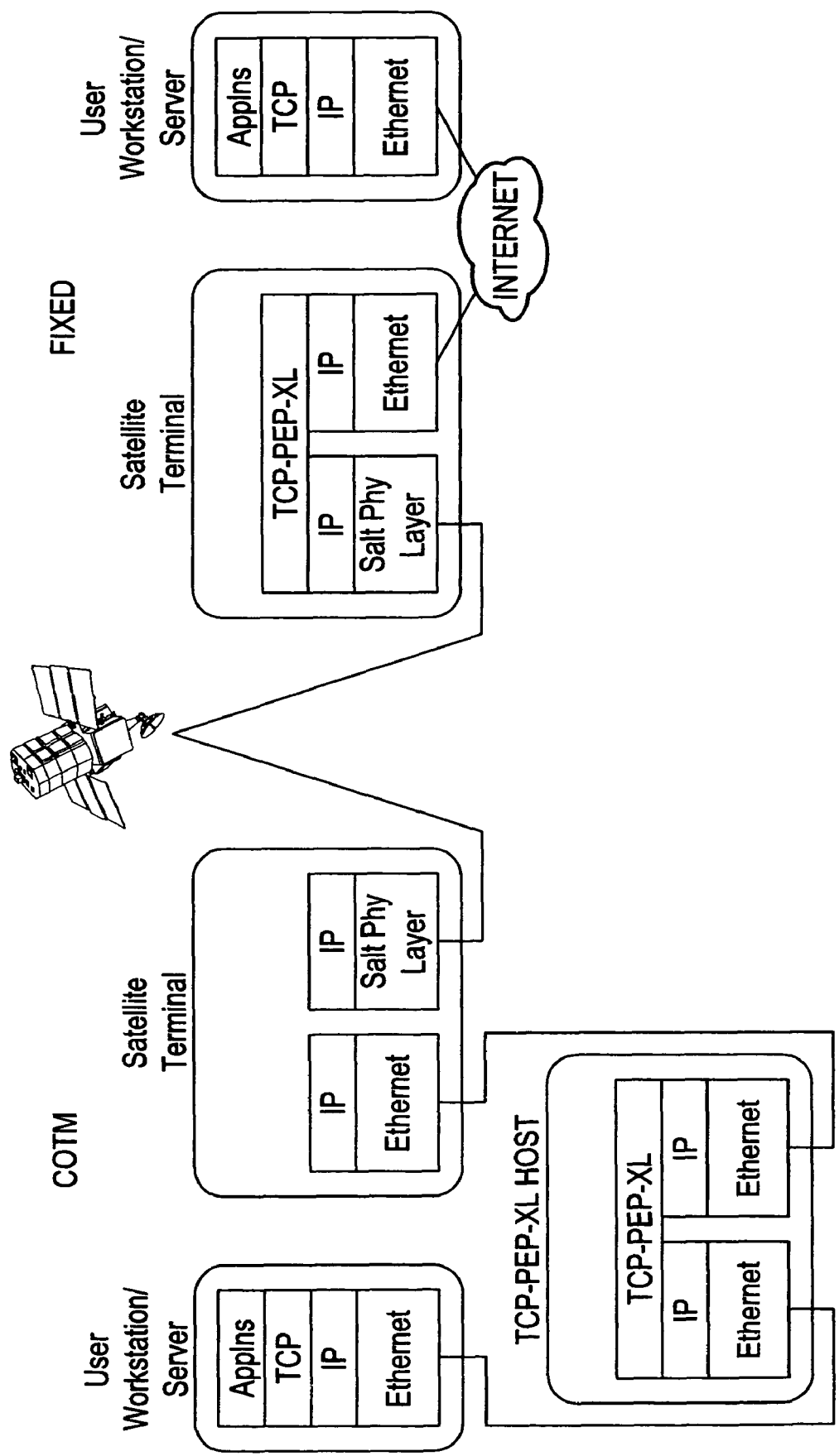
FIG. 12 an illustration of yet another exemplary satellite based TCP/IP communication network, having plural satellite terminals that are in communication with a satellite over wireless links and at least one is coupled to a host having performance enhancing proxy equipment.

FIG. 12 is an example of a bent-pipe, or simple relay satellite. Additionally, the improved TCP feature of the COTM is implemented in a stand-alone host communicating via Ethernet to the satellite terminal. In this case, the fixed (network interface) terminal must also implement the improved TCP feature to enable the enhanced protocol to operate. Although not shown, the fixed terminal could also implement the improved TCP feature in a separate host as illustrated in the COTM terminal in this figure.

Figure 13:
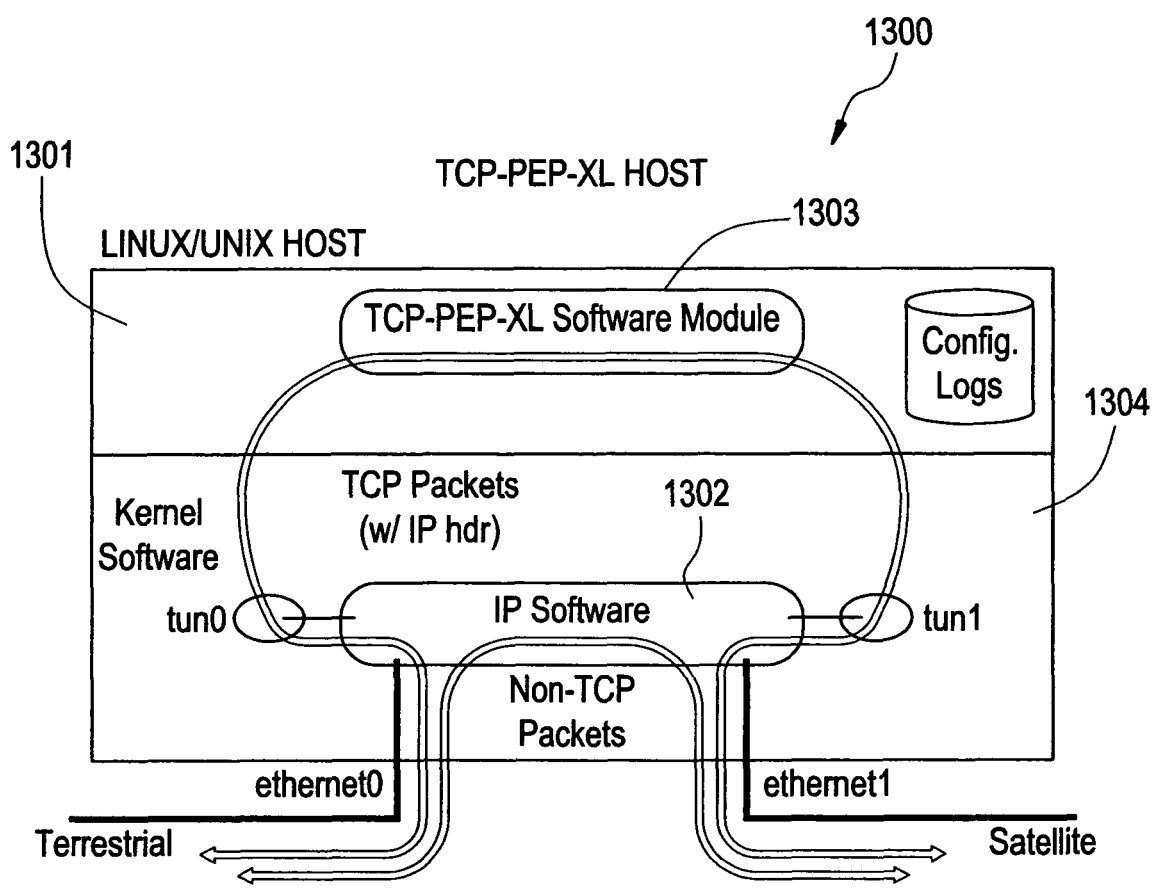
FIG. 13 illustrates a TCP-PEP host with enhanced features according to the present invention.

FIG. 13 shows an example stand-alone implementation of the TCP-PEP-XL host 1300 of FIG. 12. The protocol is implemented on a LINUX or UNIX host computer 1301 with at least two Ethernet adaptors, ethernet0 and ethernet1, connected respectively to the terrestrial network and the satellite terminal. At the IP Software layer 1302, non-TCP packets are transparently transferred per normal industrial techniques. Two tunnels, tun0 and tun1, connect the TCP-PEP-XL module 1303 (which sits at the same level as TCP) to the IP level 1304 for ethernet0 and ethernet1, respectively.

While the present invention has been described in connection with a number of embodiments, implementations, modifications and variations that have advantages specific to them, the present invention is not necessarily so limited, but covers various obvious modifications and equivalent arrangements according to the broader aspects, all according to the spirit and scope of the following claims.

The invention claimed is:

1. A method of implementing a retransmission protocol in a TCP network having a plurality of wireless links including at least one link between a first terminal and a second terminal, each of said terminals supporting a TCP retransmission protocol having a variable size window, a window size of said variable size window being varied according to a size variation protocol, said method comprising:

establishing, at the first terminal, a window size increment value to increment said window size of said variable size window; and changing said window size increment value on the basis of detected congestion and indicia of successful transmission and reception of packets between the first terminal and the second terminal, wherein said changing step comprises increasing said window size by said window size increment value in response to indicia of successful transmissions, and increasing said window size increment value by multiplying the window size increment value by a multiplication factor in response to the indicia of successful transmission and reception of packets.

2. The method of claim 1 wherein said size variation protocol comprises:

(a) setting the window size of the variable size window to an initial window size, and setting the window size increment value to an initial increment value;

(b) determining, for a transmitted packet, whether a packet transmission and reception time has passed; and (c) upon receipt of an acknowledgment packet, in response to the transmitted packet, increasing the window size by an amount of said window size increment value and increasing said window size increment value by multiplying the window size increment value by the multiplication factor.

3. A method as set forth in claim 2, wherein steps (b) and (c) are repeated a plurality of times.

4. The method of claim 2, further comprising decrementing the window size if there are congestion indications.

5. The method of claim 4 wherein, if congestion is reduced, the window size is increased.

6. The method of claim 2, further comprising decrementing the window size if there are packet losses.

7. The method of claim 2, further comprising at least one of resetting and reducing the window size increment value if there are packet losses.

8. The method of claim 2, further comprising resetting or reducing the window size increment value if there are congestion indications.

9. The method of claim 1, wherein the window size is not reduced if there is a retransmission of packets.

10. The method of claim 2, further comprising:

receiving at the first terminal, in response to the transmitted packet transmitted from the first terminal to the second terminal, the acknowledgment packet, wherein the acknowledgment packet includes an indicator set by the second terminal, the indicator indicating whether congestion exists in a transmission path of the packet; and adjusting, based on the indicator and further based on whether the packet transmission and the packet reception time has passed, the window size increment value.

* * * * *